United States Patent
Shinoda et al.

(10) Patent No.: US 12,211,332 B2
(45) Date of Patent: Jan. 28, 2025

(54) ACTIVITY SUPPORT APPARATUS, ACTIVITY SUPPORT METHOD, AND COMPUTER READABLE RECORDING MEDIUM

(71) Applicant: NEC Corporation, Tokyo (JP)

(72) Inventors: Shigeki Shinoda, Tokyo (JP); Yoshihiro Sato, Tokyo (JP); Shin Tominaga, Tokyo (JP); Daisuke Ikefuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 142 days.

(21) Appl. No.: 17/909,482

(22) PCT Filed: Mar. 13, 2020

(86) PCT No.: PCT/JP2020/011124
§ 371 (c)(1),
(2) Date: Sep. 6, 2022

(87) PCT Pub. No.: WO2021/181659
PCT Pub. Date: Sep. 16, 2021

(65) Prior Publication Data
US 2023/0115168 A1 Apr. 13, 2023

(51) Int. Cl.
*G06Q 10/0631* (2023.01)
*G07C 9/28* (2020.01)

(52) U.S. Cl.
CPC ........ *G07C 9/28* (2020.01); *G06Q 10/063114* (2013.01); *G07C 2209/08* (2013.01)

(58) Field of Classification Search
CPC ........ G07C 9/28; G07C 2209/08; G07C 1/10; G06Q 10/063114; H04W 4/029; H04W 4/04; G06K 19/0723; G06K 19/06028
See application file for complete search history.

(56) References Cited

U.S. PATENT DOCUMENTS

2013/0314210 A1* 11/2013 Schoner ................. G06Q 10/06
340/8.1
2019/0191278 A1* 6/2019 Singh .................... G06Q 50/26

FOREIGN PATENT DOCUMENTS

| JP | H11-66477 A | 3/1999 |
|---|---|---|
| JP | 2003-046423 A | 2/2003 |
| JP | 2003-087361 A | 3/2003 |
| JP | 2005-286531 A | 10/2005 |
| JP | 2006-285643 A | 10/2006 |
| JP | 2009-193564 A | 8/2009 |

(Continued)

OTHER PUBLICATIONS

International Search Report for PCT Application No. PCT/JP2020/011124, mailed on Jun. 9, 2020.

(Continued)

*Primary Examiner* — Vernal U Brown
(74) *Attorney, Agent, or Firm* — Sughrue Mion, PLLC

(57) ABSTRACT

An activity support apparatus supports an activity of a worker at a disaster site. The activity support apparatus comprises a position acquisition unit that acquires a position of the worker, a boundary data acquisition unit that acquires boundary data that indicates a boundary of a building at the disaster site, and an entry determination unit that determines whether the worker has entered the building based on the positions of the worker acquired at different timings and the boundary data.

15 Claims, 10 Drawing Sheets

(56) References Cited

FOREIGN PATENT DOCUMENTS

| JP | 2016-181896 | A | 10/2016 |
| JP | 2017-204841 | A | 11/2017 |
| JP | 6379271 | B1 | 8/2018 |
| JP | 2018-147439 | A | 9/2018 |

OTHER PUBLICATIONS

English translation of Written opinion for PCT Application No. PCT/JP2020/011124, mailed on Jun. 9, 2020.
JP Office Action for JP Application No. 2022-505688, mailed on Sep. 26, 2023 with English Translation.
JP Office Action for JP Application No. 2022-505688, mailed on Aug. 1, 2023 with English Translation.

* cited by examiner

ACTIVITY SUPPORT APPARATUS, ACTIVITY SUPPORT METHOD, AND COMPUTER READABLE RECORDING MEDIUM

CROSS REFERENCE TO RELATED APPLICATIONS

This application is a National Stage of Application No. PCT/JP2020/11124 filed Mar. 13, 2020 the disclosure of which is incorporated herein in its entirety by reference.

TECHNICAL FIELD

The present invention relates to an activity support apparatus, an activity support method and a computer-readable recording medium having recorded therein a program for realizing the apparatus and the method.

BACKGROUND ART

At a disaster site, for example, a firefighting work site, a commander gives instructions to each worker by radio so that the workers can work safely and efficiently. In order to give instructions to each worker, the commander needs to know the status of each worker. Patent document 1 discloses an apparatus that enables a monitor to ascertain the position of a person being monitored. Upon receiving the longitude and latitude positions of a rescuer, the apparatus described in Patent Document 1 superimposes a mark indicating the rescuer's position on a building sketch based on the position information and outputs it to a display screen.

LIST OF RELATED ART DOCUMENTS

Patent Document

Patent Document 1: Japanese Patent Laid-Open Publication No. 2009-193564

SUMMARY OF INVENTION

Problems to be Solved by the Invention

Patent document 1 allows the position of a rescuer to be ascertained from outside the facility. However, with this Patent Document 1, when the rescuer is near the wall of a building, it may be difficult to ascertain whether the rescuer is inside the wall (inside the facility) or outside of the wall (outside the facility). As a result, the commander may mistakenly believe that the rescuer is inside the facility even though the rescuer is outside the facility, and as a result, may give incorrect instructions.

An example of object of the present invention is to provide an activity support apparatus and an activity support method capable of determining whether a worker has entered a building, and a computer-readable recording medium having recorded therein a program for realizing the apparatus and the method.

Means for Solving the Problems

In order to achieve the above object, an activity support apparatus in one aspect of the present invention is an activity support apparatus that supports an activity of a worker at a disaster site,
the activity support apparatus includes:
a position acquisition unit that acquires a position of the worker,
a boundary data acquisition unit that acquires boundary data indicating a boundary of a building at the disaster site, and
an entry determination unit that determines whether the worker has entered the building based on the positions of the worker acquired at different timings and the boundary data.

Further, in order to achieve the above object, an activity support method in one aspect of the present invention is an activity support method that supports an activity of a worker at a disaster site, the activity support method includes:
a step of acquiring a position of the worker,
a step of acquiring boundary data that indicates a boundary of a building at the disaster site, and
a step of determining whether the worker has entered the building based on the positions of the worker acquired at different timings and the boundary data.

Further, in order to achieve the above object, a computer-readable recording medium in one aspect of the present invention is a computer-readable recording medium includes a program, which allows a computer to support an activity of a worker at a disaster site, recorded thereon, the program including instructions that cause a computer to execute:
a step of acquiring a position of the worker,
a step of acquiring boundary data that indicates a boundary of a building at the disaster site, and
a step of determining whether the worker has entered the building based on the positions of the worker acquired at different timings and the boundary data.

Advantageous Effects of the Invention

According to the present invention, it is possible to determine whether a worker at the disaster site has entered a building.

EXAMPLE EMBODIMENTS

Example Embodiment 1

Hereinafter, an activity support apparatus, an activity support method, and a program according to the example embodiment 1 of the present invention will be described with reference to FIGS. 1 to 5.

[Description of Configuration]

Figure 1:
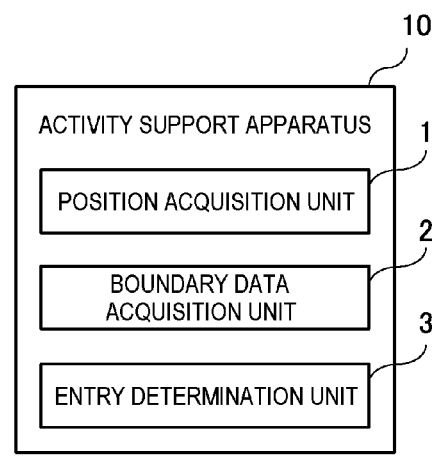
FIG. 1 is a block diagram showing a configuration of an activity support apparatus according to the example embodiment 1.

FIG. 1 is a block diagram showing a configuration of the activity support apparatus 10 according to the example embodiment. The activity support apparatus 10 is an apparatus that supports the activities of workers at disaster sites such as fire sites. The activity support apparatus 10 includes a position acquisition unit 1, a boundary data acquisition unit 2 and an entry determination unit 3.

The position acquisition unit 1 acquires the positions of workers at the disaster site.

The boundary data acquisition unit 2 acquires boundary data indicating boundary of a building at the disaster site. Boundary data will be described later.

The entry determination unit 3 determines whether the worker has entered the building based on the worker's positions acquired at different timings and the boundary data.

The activity support apparatus 10 determines whether the worker at the disaster site has entered the building. A commander who commands the worker can know whether the worker is inside the building or outside the building from the determination result. As a result, the commander can avoid giving wrong instructions to the worker by mistakenly believing that the worker is outside the building even though the worker has entered the building.

Subsequently, a configuration of the activity support apparatus 10 will be specifically described with reference to FIGS. 2 to 5.

Figure 2:
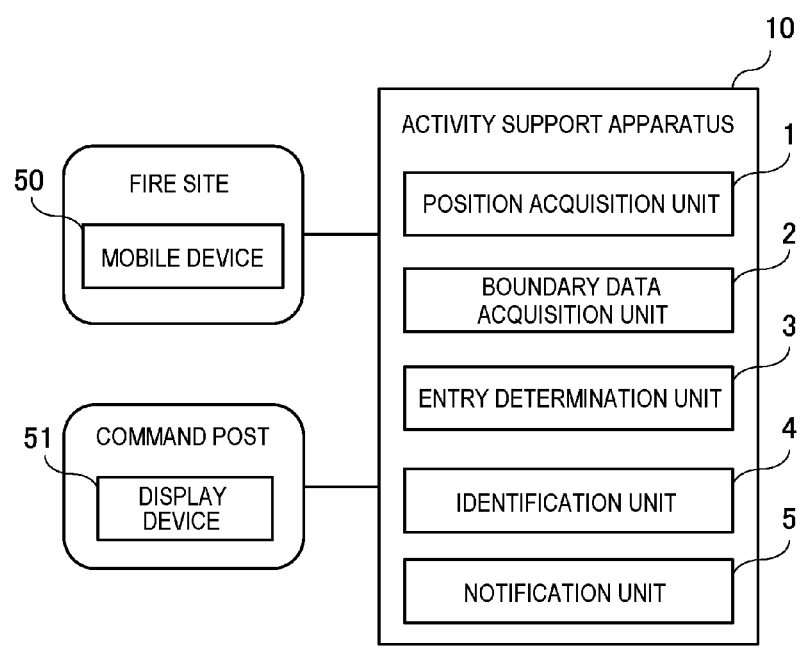
FIG. 2 is a block diagram specifically showing a configuration of the activity support apparatus.

FIG. 2 is a block diagram specifically showing a configuration of the activity support apparatus 10.

In the following explanation, the disaster site is assumed to be the fire site. It is assumed that the workers are engaged in fire extinguishing and rescue activities at the fire site, and that the commander who commands each worker gives instructions to each worker from the command post. In addition, it is assumed that the worker carries a mobile device 50 and a display device 51 is installed at the command post.

The activity support apparatus 10 can perform data communication with the mobile device 50 and the display device 51.

The mobile device 50 is, for example, a wristwatch-type wearable terminal. The mobile device 50 has a function of receiving the positioning signal of a positioning system and acquiring position data of the current position. The positioning system is GNSS (Global Navigation Satellite System) such as GPS, Galileo, and GLONASS.

The display device 51 displays the data received from the activity support apparatus 10 on the screen. The display device 51 may be a general-purpose PC (personal computer), a smart phone, a tablet-type terminal device, or the like. The activity support apparatus 10 and the display device 51 may be provided integrally. Further, the activity support apparatus 10 may be provided at the same location as the display device 51, or may be provided at a separate location.

The activity support apparatus 10 includes an identification unit 4 and a notification unit 5 in addition to the position acquisition unit 1, the boundary data acquisition unit 2, and the entry determination unit 3 described above.

The position acquisition unit 1 acquires the position of the worker at the fire site by receiving position data from the mobile device 50. In addition, when there are a plurality of workers at the fire site and each worker carries the mobile device 50, the position acquisition unit 1 may receive the ID of the worker from the mobile device 50 together with the position data.

The boundary data acquisition unit 2 acquires boundary data indicating a boundary of a building at the disaster site. Boundary data is position data of a boundary line between the inside and outside of the building, for example, position data of an outer wall of the building. In addition, the boundary data includes position data of entrances such as windows and doors that allow entry into the building (hereinafter referred to as entrance data).

The boundary data acquisition unit 2 acquires boundary data of an area designated by the commander, for example. The boundary data acquisition unit 2 may acquire the boundary data from a service provider that provides the boundary data, or may acquire the boundary data from a storage device in which the boundary data is stored in advance. The storage device that stores the boundary data may be included in the activity support apparatus 10 or may be installed outside. The boundary data may also be extracted from map data of the disaster site that includes building information.

The entry determination unit 3 determines whether the worker has entered the building based on the positions of the worker acquired by the position acquisition unit 1 at different timings and the boundary data acquired by the boundary data acquisition unit 2.

Figure 3:
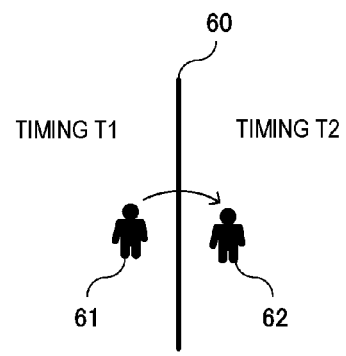
FIG. 3 is a diagram for explaining a method of determining whether a worker has entered a building.

FIG. 3 is a diagram for explaining a method of determining whether the worker has entered the building.

FIG. 3 shows a worker's position 61 acquired at timing T1 and a worker's position 62 acquired at timing T2 after timing T1. A boundary line 60 based on the boundary data is also shown between the two positions 61 and 62 of the worker. As shown in FIG. 3, the worker's position 62 acquired at timing T2 has changed across the boundary line 60 from the worker's position 61 acquired at timing T1. In this case, the entry determination unit 3 determines that the worker has entered the building.

At this time, the entry determination unit 3 may determine that the worker has entered if there is no change in the position of the worker across the boundary for a predetermined time after the worker's position has changed across the boundary. Referring to FIG. 3, the entry determination unit 3 determines that the worker has entered the building if the worker's position across the boundary line 60 has not been acquired for the predetermined time after the position 62 is acquired by the position acquisition unit 1. Positioning signals from GPS and the like may contain errors. For this reason, the determination made only once may lead to an erroneous determination result. Therefore, the entry determination unit 3 can avoid erroneous determinations by making determinations as described above.

Return to FIG. 2. The identification unit 4 identifies the entry position of the worker when the worker enters the building. Referring to FIG. 3, the identification unit 4 identifies the vicinity of the intersection of the boundary line 60 and the straight line connecting the worker's positions 61 and 62 as the worker's entry position. The identification unit 4 determines whether or not there is an entrance of the building near the specified entry position based on the entrance data included in the boundary data. If there is an entrance, the identification unit 4 identifies the entrance as the worker's entry position.

Figure 4:
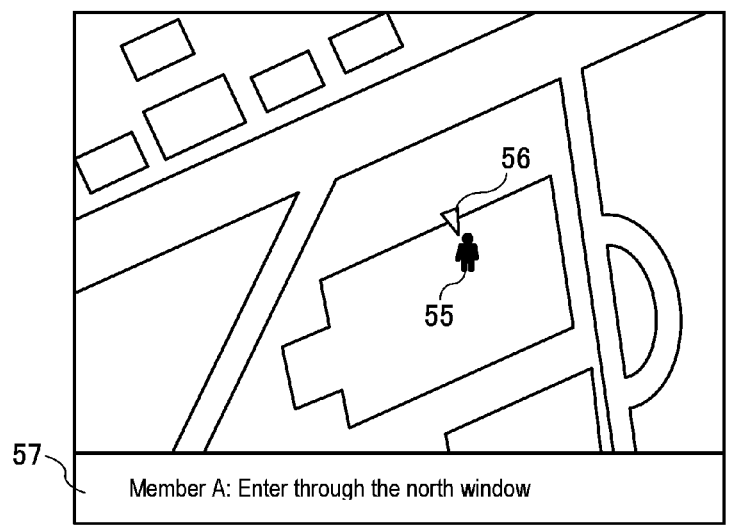
FIG. 4 is a diagram showing an example of a display screen for notifying an entry position of a worker.

The notification unit 5 notifies the commander of the determination result of the entry determination unit 3 and the identification result of the identification unit 4 by displaying the screen on the display device 51 installed at the command post. FIG. 4 is a diagram showing an example of a display screen for notifying the entry position of the worker. FIG. 4 shows the display screen when the worker has entered the building.

The notification unit 5 transmits the map data of the fire site to the display device 51. As a result, a map of the fire site is displayed on the display device 51. In addition, the notification unit 5 transmits to the display device 51 the fact that the worker has entered the building, the position of the worker after entering, and the identified entry position. The display device 51 displays a mark 55 indicating the worker's position after entering the building, a mark 56 indicating the worker's entry position, and character information 57.

Note that the notification unit 5 may transmit the worker's position data to the display device 51 at any time when the worker has not entered the building. In this case, the commander can grasp the worker's position in real time. Then, the entry of the worker into the building can be grasped in real time from the determination result of the entry determination unit 3. The notification unit 5 may also notify the determination result of the entry determination unit 3 and the identification result of the identification unit 4 to the mobile devices 50 of other workers.

Furthermore, if the entry position designated in advance by the commander in the activity support apparatus 10 is different from the entry position identified by the identification unit 4, the notification unit 5 may notify the position where the worker has entered. In this case, the commander can grasp worker's behavior contrary to the commander's will.

Moreover, when there is no entrance, the identification unit 4 may identify that the wall of the building has been destroyed to enter. In this case, by notifying the commander, the commander can use the position as an evacuation route for workers.

[Apparatus Operations]

Figure 5:
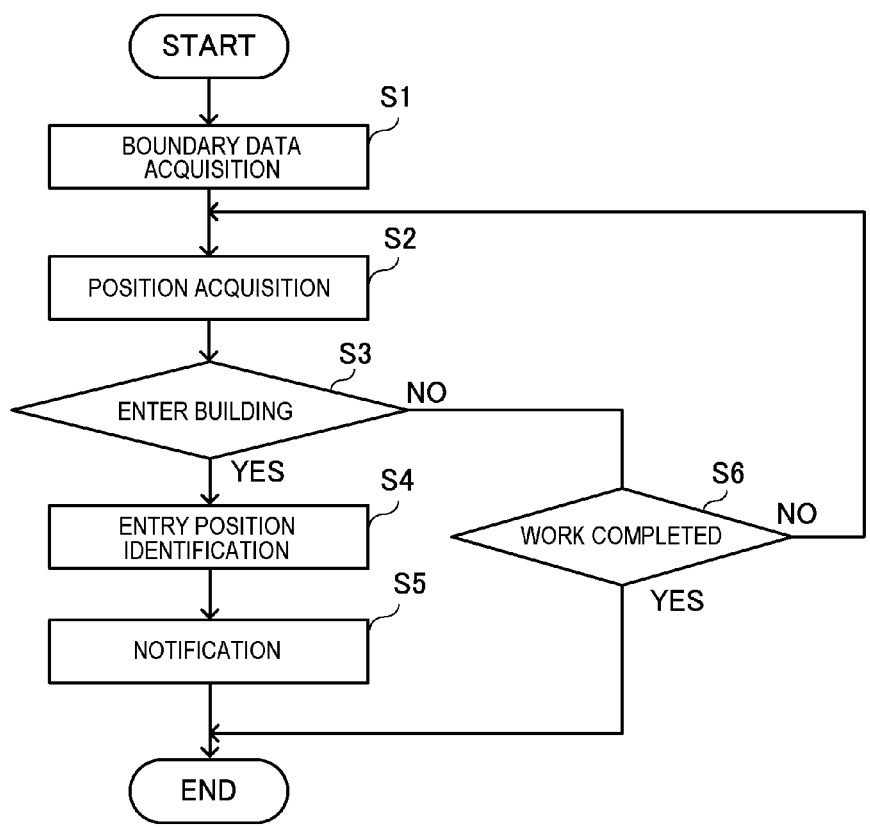
FIG. 5 is a flow diagram showing an operation of the activity support apparatus according to the example embodiment 1.

Next, the operation of the activity support apparatus 10 in the example embodiment will be described with reference to FIG. 5. FIG. 5 is a flow diagram showing the operation of the activity support apparatus 10 according to the example embodiment. In the example embodiment, the activity support method is implemented by operating the activity support apparatus 10. Therefore, the description of the activity support method in the example embodiment will be replaced with the following description of the operation of the activity support apparatus 10.

The boundary data acquisition unit 2 acquires boundary data (S1). Next, the position acquisition unit 1 acquires the position of the worker by receiving the position data acquired from the positioning signal by the mobile device 50 (S2). The entry determination unit 3 determines whether the worker has entered the building (S3).

As described with reference to FIG. 3, the entry determination unit 3 determines whether the position acquired in S2 (e.g., position 62 in FIG. 3) has changed from the position acquired in the S2 previously executed (e.g., position 61 in FIG. 3) across the boundary line of the boundary data acquired in S1 (e.g., boundary line 60 in FIG. 3). If the worker has not entered (S3: NO), it is determined whether the work at the fire site has been finished (S6). If the work at the fire site has not been finished (S6: NO), the process of S2 is executed. If the work at the fire site has been finished (S6: YES), this process ends.

If the worker has entered the building (S3: YES), the identification unit 4 identifies the entry position (S4). Then, the notification unit 5 notifies the fact that the worker has entered the building, the position of the worker after entering, and the identified entry position (S5). The notification unit 5 transmits these data to the display device 51, for example. By displaying the screen shown in FIG. 4 on the display device 51, the commander is notified that the worker has entered the building.

In the above explanation, the disaster site is a fire site, but it may be another disaster site such as a site where a building collapsed due to an earthquake or a site where a gas leak occurred.

[Program]

It is sufficient for the program according to the example embodiment 1 to be a program that causes a computer to execute each step shown in FIG. 5. The activity support apparatus 10 and the activity support method according to the example embodiment can be realized by installing this program in the computer and executing this program. In this case, a processor of the computer functions as the position acquisition unit 1, the boundary data acquisition unit 2, the entry determination unit 3, the identification unit 4, and the notification unit 5, and performs processing.

Also, the program according to the example embodiment may be executed by a computer system constituted by a plurality of computers. In this case, for example, each computer may function as any of the position acquisition unit 1, the boundary data acquisition unit 2, the entry determination unit 3, the identification unit 4, and the notification unit 5.

In addition to general-purpose PCs, smart phones and tablet-type terminal devices are examples of computers.

Effect in the Example Embodiment 1

According to the activity support apparatus 10 of the example embodiment, it can be determined whether the worker has entered the building. By notifying the commander of this determination result, the commander can avoid the risk of giving inappropriate instructions as a result of mistakenly believing that the worker is inside the building even though the worker is outside. In addition, by notifying the other workers at the disaster site of the determination results, the other workers can easily grasp the situation at the other sites.

Example Embodiment 2

Next, an activity support apparatus, an activity support method, and a program according to the example embodiment 2 of the present invention will be described with reference to FIGS. 6 to 9.

Figure 6:
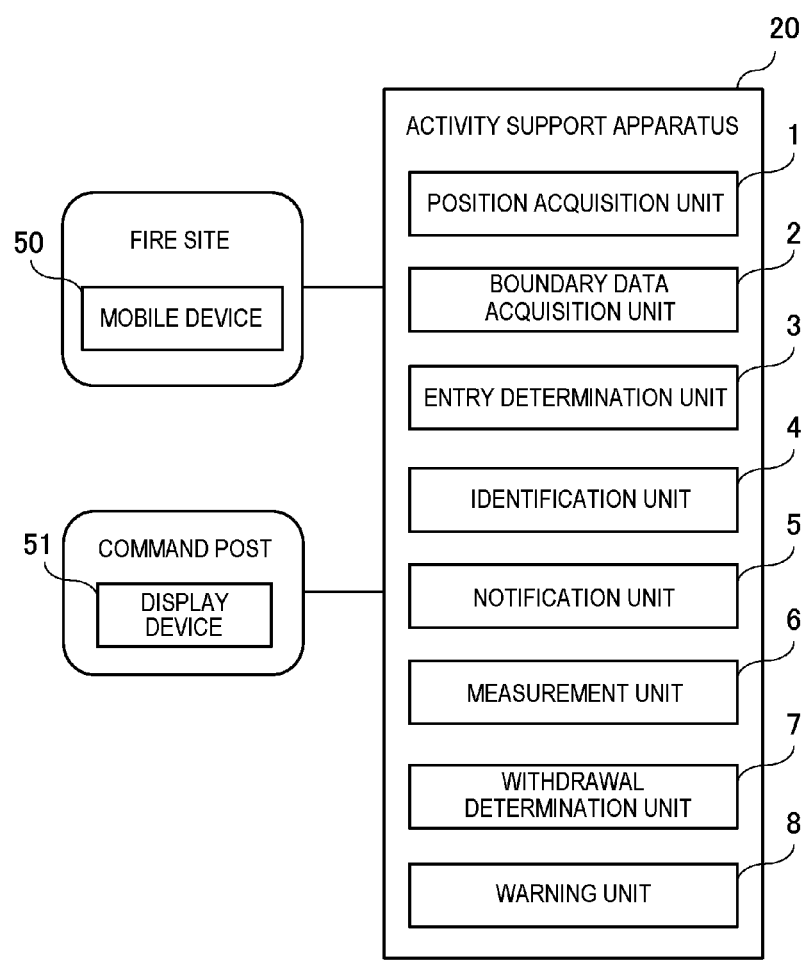
FIG. 6 is a block diagram showing a specific configuration of an activity support apparatus according to the example embodiment 2.

FIG. 6 is a block diagram showing a specific configuration of the activity support apparatus 20 according to the example embodiment.

In addition to the position acquisition unit 1, the boundary data acquisition unit 2, the entry determination unit 3, the identification unit 4, and the notification unit 5 described in the example embodiment 1, the activity support apparatus 20 includes a measurement unit 6, a withdrawal determination unit 7, and a warning unit 8. Since the position acquisition unit 1, the boundary data acquisition unit 2, the entry determination unit 3, the identification unit 4, and the notification unit 5 are the same as those in the example embodiment 1, description thereof will be omitted.

The measurement unit 6 measures time after the entry determination unit 3 determines that the worker has entered the building. In other words, the measuring unit 6 is a timer that measures the time the worker is continuously inside the building.

A withdrawal determination unit 7 determines whether the worker has withdrawn from the building after the entry determination unit 3 has determined that the worker has entered the building. As with the entry determination unit 3, the withdrawal determination unit 7 determines based on the positions of the worker acquired at different timings and the boundary data. Referring to FIG. 3, the worker's position 61 acquired at timing T1 is assumed to be inside the building. The withdrawal determination unit 7 determines that the worker has withdrawn from the building when the worker's position 62 acquired at timing T2 after timing T1 has changed from position 61 across the boundary line 60.

The warning unit 8 warns that the activity time is exceeded when the withdrawal determination unit 7 determines that the worker has not withdrawn from the building and the time measured by the measurement unit 6 exceeds a certain period of time. The warning unit 8 may warn the commander via the display device 51 or warn the worker via the mobile device 50. The certain period of time may be a predetermined time, or may be appropriately changed depending on the content of the warning. A case in which the certain period of time is determined according to the content of the warning will be described below.

Figure 7:
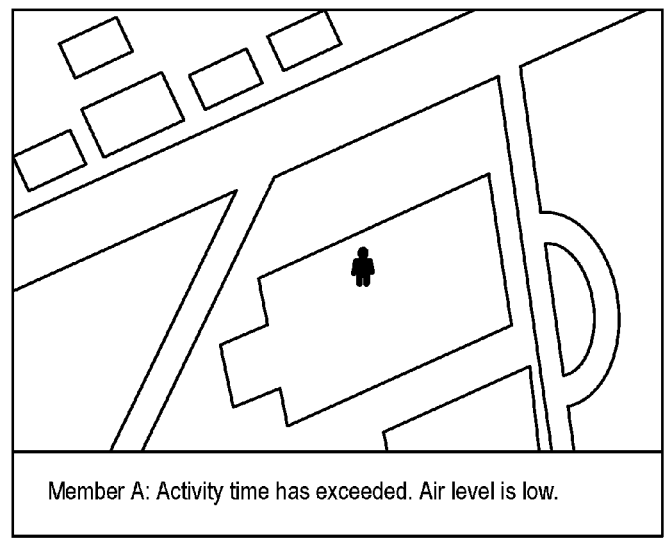
FIG. 7 is a diagram showing an example of a warning screen for warning of overtime.

In the case of warning about the amount of air remaining in an air respirator carried by the worker, the certain period of time is determined based on the amount of air remaining in the air respirator. Activity time at the fire site is limited by the amount of air remaining in the air respirator the worker has. Therefore, the activity support apparatus 20 acquires the remaining amount of air in the air respirator directly from the air respirator or via the mobile device 50. Then, the activity support apparatus 20 estimates the time from the current remaining amount of air until the remaining amount of air reaches 30% through continued use, and sets the estimated time as certain period of time. Note that 30% is an example. If the worker stays in the building continuously for more than the certain period of time, the air in the respirator will run out and the worker will be in danger, so the warning unit 8 issues a warning. FIG. 7 is a diagram showing an example of a warning screen for warning of overtime.

Figure 8:
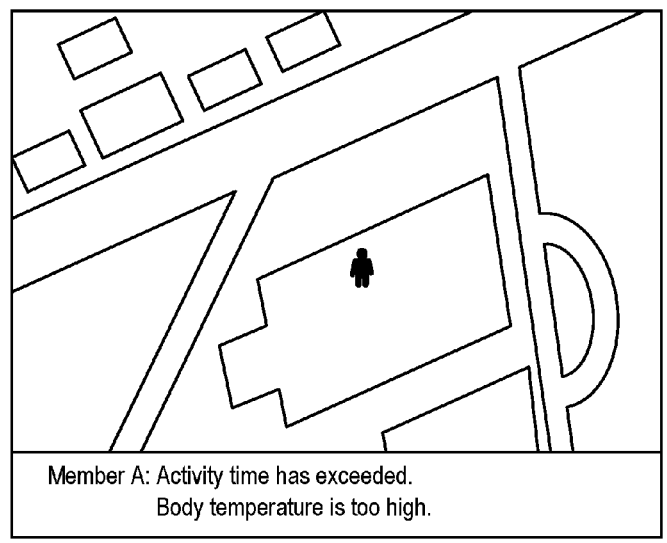
FIG. 8 is a diagram showing another example of a warning screen for warning of overtime.

Furthermore, when warning about a worker's physical condition is performed, the certain period of time is determined based on a worker's biometric information. If the worker's body temperature is abnormally high or the amount of perspiration is large, working for a long time at the fire site poses a danger to the worker. Therefore, the activity support apparatus 20 acquires the amount of perspiration or body temperature of the worker from the mobile device 50, and estimates the time during which the worker can be physically active based on rules set in advance based on empirical rules, etc., and the estimated time is set as the certain period of time. When the worker's continuous time in the building exceeds the certain period of time, the worker's body is in danger, so the warning unit 8 issues a warning. FIG. 8 is a diagram showing another example of a warning screen for warning of overtime.

Note that the warning by the warning unit 8 may be given by voice. Also, the warning unit 8 may warn the worker from the mobile device 50.

[Apparatus Operations]

Figure 9:
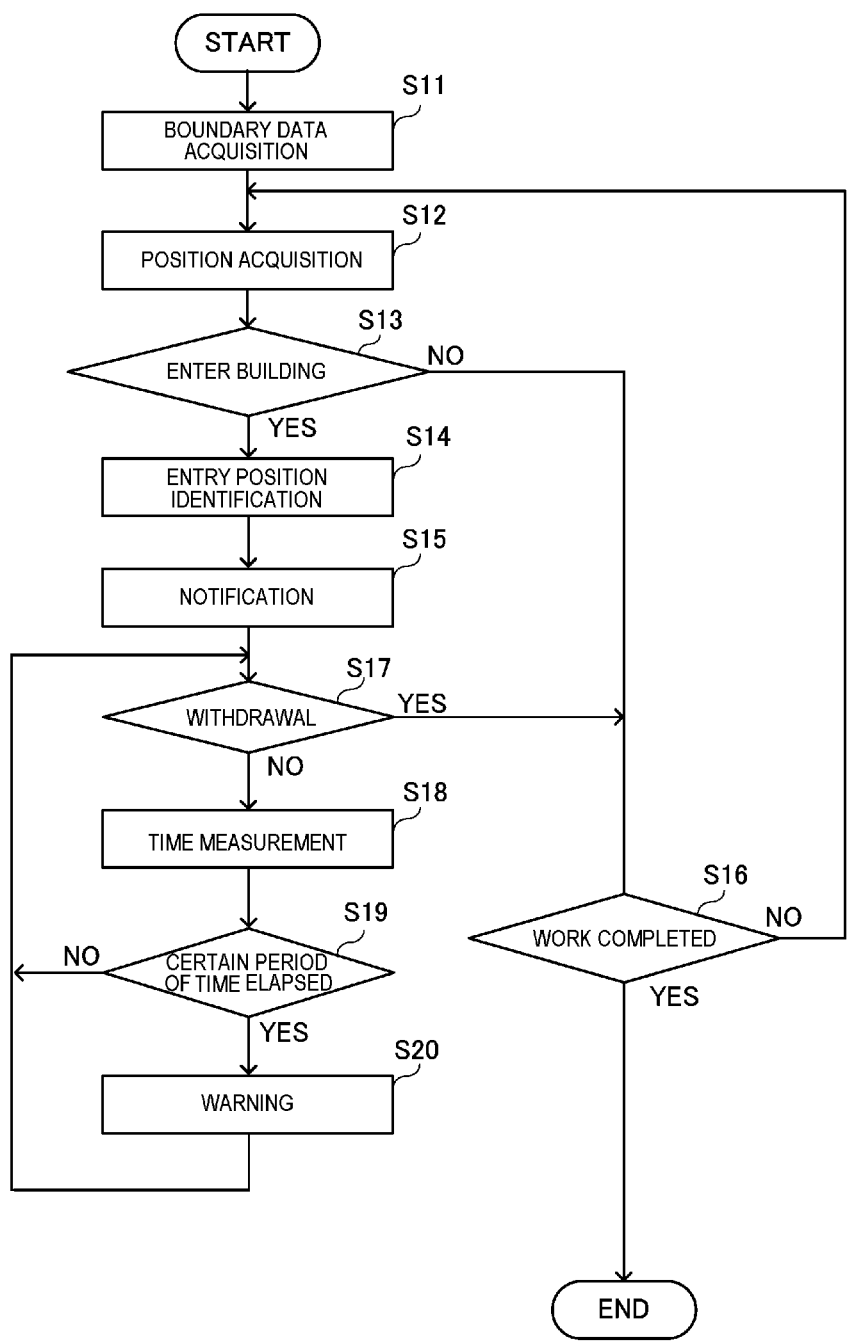
FIG. 9 is a flow diagram showing an operation of the activity support apparatus according to the example embodiment 2.

Next, the operation of the activity support apparatus 20 in the example embodiment will be described with reference to FIG. 9. FIG. 9 is a flow diagram showing the operation of the activity support apparatus 20. In the example embodiment, the activity support method is implemented by operating the activity support apparatus 20. Therefore, the description of the activity support method in the example embodiment will be replaced with the following description of the operation of the activity support apparatus 20.

S11 to S16 are the same as S1 to S6 shown in FIG. 5 of the first embodiment. That is, the boundary data acquisition unit 2 acquires boundary data (S11). Next, the position acquisition unit 1 acquires the position of the worker by receiving the position data acquired from the positioning signal by the mobile device 50 (S12). The entry determination unit 3 determines whether the worker has entered the building (S13). If the worker has not entered (S13: NO), it is determined whether the work at the fire site has been finished (S16). If the work at the fire site has not been finished (S16: NO), the process of S12 is executed. If the work at the fire site has been finished (S16: YES), this process ends. If the worker has entered the building (S13: YES), the identification unit 4 identifies the entry position (S14). Then, the notification unit 5 notifies the fact that the worker has entered the building, the position of the worker after entering, and the identified entry position (S15).

Next, the withdrawal determination unit 7 determines whether the worker who entered the building has withdrawn from the building (S17). If the worker has not withdrawn (S17: NO), the measurement unit 6 measures the time the worker is continuously inside the building. (S18). The warning unit 8 determines whether the measured time exceeds the certain period of time (S19). If the certain period of time has not elapsed (S19: NO), the process of S17 is executed. If the certain period of time has elapsed (S19: YES), the warning unit 8 warns that the activity time has exceeded (S20). Then, the process of S17 is executed. If it is determined in S17 that the worker has withdrawn (S18: YES), the process of S16 is executed.

[Program]

It is sufficient for the program according to the example embodiment 2 to be a program that causes a computer to execute each step shown in FIG. 9. The activity support apparatus 20 and the activity support method according to the example embodiment can be realized by installing this program in the computer and executing this program. In this case, a processor of the computer functions as the position acquisition unit 1, the boundary data acquisition unit 2, the entry determination unit 3, the identification unit 4, the notification unit 5, the measurement unit 6, the withdrawal determination unit 7, and the warning unit 8, and performs processing.

Also, the program according to the example embodiment may be executed by a computer system constituted by a plurality of computers. In this case, for example, each computer may function as any of the position acquisition unit 1, the boundary data acquisition unit 2, the entry determination unit 3, the identification unit 4, the notification unit 5, the measurement unit 6, the withdrawal determination unit 7, and the warning unit 8.

In addition to general-purpose PCs, smart phones and tablet-type terminal devices are examples of computers.

Effect in the Example Embodiment 2

According to the activity support apparatus 20 of the example embodiment, it can be determined whether the worker has entered the building. By notifying the commander of this determination result, the commander can avoid the risk of giving inappropriate instructions as a result of mistakenly believing that the worker is inside the building even though the worker is outside. In addition, by notifying the other workers at the disaster site of the determination results, the other workers can easily grasp the situation at the other sites. Furthermore, the activity support apparatus 20 warns when the worker stays in the building continuously for a long time, thereby avoiding danger to the worker.

[Physical Configuration]

Figure 10:
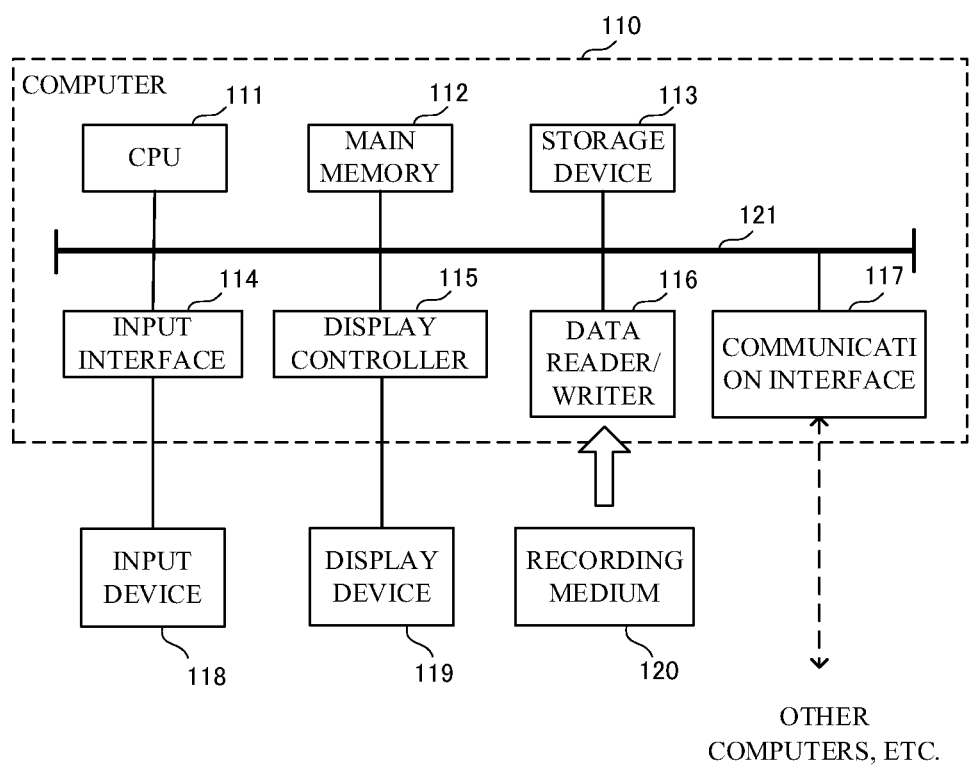
FIG. 10 is a block diagram showing an example of a computer that realizes the activity support apparatus according to the example embodiments 1 and 2.

Here, a computer that realizes the activity support apparatus by executing the programs in the example embodiments 1 and 2 will be described with reference to FIG. 10. FIG. 10 is a block diagram illustrating one example of a computer realizing the activity support apparatus in the example embodiments 1 and 2.

As illustrated in FIG. 10, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a GPU (Graphics Processing Unit) or a FPGA (Field-Programmable Gate Array) in addition to the CPU 111 or in place of the CPU 111.

The CPU 111 loads the programs (codes) in the example embodiments 1 and 2, which are stored in the storage device 113, onto the main memory 112, and performs various computations by executing these codes in a predetermined order. The main memory 112 is typically a volatile storage device such as a DRAM (Dynamic Random Access Memory). Furthermore, the programs in the example embodiments 1 and 2 are provided in a state such that the programs are stored in a computer readable recording medium 120. Note that the programs in the example embodiments 1 and 2 may also be programs that are distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CF (Compact Flash; registered trademark) card or a SD (Secure Digital) card, a magnetic recording medium such as a flexible disk, and an optical recording medium such as a CD-ROM (Compact Disk Read Only Memory).

Note that the activity support apparatuses in the example embodiments 1 and 2 can also be realized by using pieces of hardware corresponding to the respective units, rather than using a computer on which the program is installed. Furthermore, a portion of the activity support apparatus may be realized by using a program, and the remaining portion of the activity support apparatus may be realized by using hardware.

The configurations of Embodiments 1 and 2 described above can be combined as appropriate. While a part of or the entirety of the above-described example embodiments 1 and 2 can be expressed by (Supplementary note 1) to (Supplementary note 18) described in the following, the invention is not limited to the following description.

(Supplementary Note 1)

An activity support apparatus that supports an activity of a worker at a disaster site, the activity support apparatus including:
  a position acquisition unit that acquires a position of the worker,
  a boundary data acquisition unit that acquires boundary data indicating a boundary of a building at the disaster site, and
  an entry determination unit that determines whether the worker has entered the building based on the positions of the worker acquired at different timings and the boundary data.

(Supplementary Note 2)

The activity support apparatus according to Supplementary note 1, wherein
  the entry determination unit determines that the worker has entered if the positions of the worker acquired at different timings change across the boundary.

(Supplementary Note 3)

The activity support apparatus according to Supplementary note 2, wherein
  the entry determination unit determines that the worker has entered if there is no change in the position of the worker across the boundary for a predetermined time after the position of the worker has changed across the boundary.

(Supplementary Note 4)

The activity support apparatus according to any one of Supplementary notes 1 to 3, wherein
  the boundary data includes position data of an entrance that allow entry into the building,
  the activity support apparatus further including:
  an identification unit that identifies an entry position of the worker when the worker is determined to have entered.

(Supplementary Note 5)

The activity support apparatus according to any one of Supplementary notes 1 to 4, further including:
  a measurement unit that measures time after the worker is determined to have entered the building,
  a withdrawal determination unit that determines whether the worker has withdrawn from the building based on the positions of the worker acquired at different timings and the boundary data, after the worker is determined to have entered the building, and
  a warning unit that warns of exceeding activity time if it is determined that the worker has not withdrawn from the building and the time measured exceeds a certain period of time.

(Supplementary Note 6)

The activity support apparatus according to any one of Supplementary notes 1 to 5, wherein
  the position acquisition unit acquires a position based on a positioning signal from positioning system.

(Supplementary Note 7)

An activity support method that supports an activity of a worker at a disaster site, the activity support method including:

a step of acquiring a position of the worker, a step of acquiring boundary data that indicates a boundary of a building at the disaster site, and a step of determining whether the worker has entered the building based on the positions of the worker acquired at different timings and the boundary data.

(Supplementary Note 8)

The activity support method according to Supplementary note 7, wherein in the step of determining whether the worker has entered the building, determining that the worker has entered if the positions of the worker acquired at different timings change across the boundary.

(Supplementary Note 9)

The activity support method according to Supplementary note 8, wherein in the step of determining whether the worker has entered the building, determining that the worker has entered if there is no change in the position of the worker across the boundary for a predetermined time after the position of the worker has changed across the boundary.

(Supplementary Note 10)

The activity support method according to any one of Supplementary notes 7 to 9, wherein the boundary data includes position data of an entrance that allow entry into the building, the activity support method further including:

a step of identifying an entry position of the worker when the worker is determined to have entered.

(Supplementary Note 11)

The activity support method according to any one of Supplementary notes 7 to 10, further including:

a step of measuring time after the worker is determined to have entered the building, a step of determining whether the worker has withdrawn from the building based on the positions of the worker acquired at different timings and the boundary data, after the worker is determined to have entered the building, and a step of warning of exceeding activity time if it is determined that the worker has not withdrawn from the building and the time measured exceeds a certain period of time.

(Supplementary Note 12)

The activity support method according to any one of Supplementary notes 7 to 11, wherein in the step of acquiring the position of the worker, acquiring a position based on a positioning signal from positioning system.

(Supplementary Note 13)

A computer-readable recording medium that includes a program, which allows a computer to support an activity of a worker at a disaster site, recorded thereon, the program including instructions that cause a computer to execute:

a step of acquiring a position of the worker, a step of acquiring boundary data that indicates a boundary of a building at the disaster site, and a step of determining whether the worker has entered the building based on the positions of the worker acquired at different timings and the boundary data.

(Supplementary Note 14)

The computer-readable recording medium according to Supplementary note 13, wherein in the step of determining whether the worker has entered the building, determining that the worker has entered if the positions of the worker acquired at different timings change across the boundary.

(Supplementary Note 15)

The computer-readable recording medium according to Supplementary note 14, wherein in the step of determining whether the worker has entered the building, determining that the worker has entered if there is no change in the position of the worker across the boundary for a predetermined time after the position of the worker has changed across the boundary.

(Supplementary Note 16)

The computer-readable recording medium according to any one of Supplementary notes 13 to 15, wherein the boundary data includes position data of an entrance that allow entry into the building, the program further including instructions that cause a computer to execute:

a step of identifying an entry position of the worker when the worker is determined to have entered.

(Supplementary Note 17)

The computer-readable recording medium according to any one of Supplementary notes 13 to 16, the program further including instructions that cause a computer to execute:

a step of measuring time after the worker is determined to have entered the building, a step of determining whether the worker has withdrawn from the building based on the positions of the worker acquired at different timings and the boundary data, after the worker is determined to have entered the building, and a step of warning of exceeding activity time if it is determined that the worker has not withdrawn from the building and the time measured exceeds a certain period of time.

(Supplementary Note 18)

The computer-readable recording medium according to any one of Supplementary notes 13 to 17, wherein in the step of acquiring the position of the worker, acquiring a position based on a positioning signal from positioning system.

REFERENCE SIGNS LIST

1 Position acquisition unit
2 Boundary data acquisition unit
3 Entry determination unit
4 Identification unit
5 Notification unit
6 Measurement unit
7 Withdrawal determination unit
8 Warning unit
10 Activity support apparatus
20 Activity support apparatus
50 Mobile device
51 Display device
55 Mark
56 Mark
57 Character information
60 Boundary line 61 Position
61 Position
110 Computer
111 CPU
112 Main memory
113 Storage device
114 Input interface
115 Display controller
116 Data reader/writer
117 Communication interface
118 Input equipment
119 Display device
120 Recording medium
121 Bus

What is claimed is:

1. An activity support apparatus that supports an activity of a worker at a disaster site, the activity support apparatus comprising:
at least one memory configured to store one or more instructions; and
at least one processor configured to execute the one or more instructions to:
acquire one or more positions of the worker at one or more different timings,
acquire boundary data that indicates a boundary of a building at the disaster site, and
determine whether the worker has entered the building based on the one or more positions of the worker and the boundary data,
wherein, after acquiring a first position, among the one or more positions, which indicates that the worker has crossed the boundary, the at least one processor further determines that the worker has entered the building based on no change from the first position of the worker across the boundary for a certain period of time, or based on no acquisition of a position of the worker across the boundary.

2. The activity support apparatus according to claim 1, wherein the at least one processor is further configured to determine that the worker has entered the building if the one or more positions of the worker acquired at the one or more different timings change across the boundary.

3. The activity support apparatus according to claim 1, wherein the boundary data includes position data of an entrance that allow entry into the building, and
wherein the at least one processor is further configured to identify an entry position of the worker when the worker is determined to have entered the building.

4. The activity support apparatus according to claim 1, wherein the at least one processor is further configured to:
measure time after the worker is determined to have entered the building,
measure whether the worker has withdrawn from the building based on the one or more positions of the worker acquired at the one or more different timings and the boundary data, after the worker is determined to have entered the building, and
warn of exceeding activity time if it is determined that the worker has not withdrawn from the building and the time measured exceeds a certain period of time.

5. The activity support apparatus according to claim 1, wherein the at least one processor is further configured to acquire a position based on a positioning signal from positioning system.

6. An activity support method that supports an activity of a worker at a disaster site, the activity support method comprising:
acquiring one or more positions of the worker at one or more different timings,
acquiring boundary data that indicates a boundary of a building at the disaster site, and
determining whether the worker has entered the building based on the one or more positions and the boundary data,
wherein, after acquiring a first position, among the one or more positions, which indicates that the worker has crossed the boundary, determining that the worker has entered the building based on no change from the first position of the worker across the boundary for a certain period of time, or based on no acquisition of a position of the worker across the boundary.

7. The activity support method according to claim 6, wherein
when determining whether the worker has entered the building,
determining that the worker has entered the building if the one or more positions of the worker acquired at the one or more different timings change across the boundary.

8. The activity support method according to claim 6, wherein
the boundary data includes position data of an entrance that allow entry into the building,
the activity support method further comprising:
identifying an entry position of the worker when the worker is determined to have entered the building.

9. The activity support method according to claim 6, further comprising:
measuring time after the worker is determined to have entered the building,
determining whether the worker has withdrawn from the building based on the one or more positions of the worker acquired at the one or more different timings and the boundary data, after the worker is determined to have entered the building, and
warning of exceeding activity time if it is determined that the worker has not withdrawn from the building and the time measured exceeds a certain period of time.

10. The activity support method according to claim 6, wherein
when acquiring the one or more positions of the worker, acquiring a position based on a positioning signal from positioning system.

11. A non-transitory computer-readable recording medium that includes a program, which allows a computer to support an activity of a worker at a disaster site, recorded thereon, the program including instructions that cause a computer to execute:
acquiring one or more positions of the worker at one or more different timings,
acquiring boundary data that indicates a boundary of a building at the disaster site, and
determining whether the worker has entered the building based on the one or more positions of the worker acquired at the one or more different timings and the boundary data,
wherein, after acquiring a first position, among the one or more positions, which indicates that the worker has crossed the boundary, determining that the worker has entered the building based on no change from the first position of the worker across the boundary for a certain period of time, or based on no acquisition of a position of the worker across the boundary.

12. The non-transitory computer-readable recording medium according to claim 11, wherein when determining whether the worker has entered the building, determining that the worker has entered the building if the one or more positions of the worker acquired at the one or more different timings change across the boundary.

13. The non-transitory computer-readable recording medium according to claim 11, wherein the boundary data includes position data of an entrance that allow entry into the building, the program further including instructions that cause a computer to execute:

identifying an entry position of the worker when the worker is determined to have entered the building.

14. The non-transitory computer-readable recording medium according to claim 11, the program further including instructions that cause a computer to execute:

measuring time after the worker is determined to have entered the building, determining whether the worker has withdrawn from the building based on the one or more positions of the worker acquired at the one or more different timings and the boundary data, after the worker is determined to have entered the building, and warning of exceeding activity time if it is determined that the worker has not withdrawn from the building and the time measured exceeds a certain period of time.

15. The non-transitory computer-readable recording medium according to claim 11, wherein when acquiring the one or more positions of the worker, acquiring a position based on a positioning signal from positioning system.

* * * * *